(12) United States Patent
Klein et al.

(10) Patent No.: US 11,286,865 B2
(45) Date of Patent: Mar. 29, 2022

(54) GAS TURBINE ENGINE WITH VARIABLE PITCH FAN AND VARIABLE PITCH COMPRESSOR GEOMETRY

(71) Applicant: Rolls-Royce North American Technologies Inc., Indianapolis, IN (US)

(72) Inventors: Kyle Klein, Indianapolis, IN (US); Michael Karam, Plainfield, IN (US); Jonathan Sands, Clayton, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 169 days.

(21) Appl. No.: 16/131,729

(22) Filed: Sep. 14, 2018

(65) Prior Publication Data
US 2020/0088108 A1   Mar. 19, 2020

(51) Int. Cl.
*F02C 9/20* (2006.01)
*F02K 3/06* (2006.01)
*F02K 1/66* (2006.01)

(52) U.S. Cl.
CPC ............... *F02C 9/20* (2013.01); *F02K 3/06* (2013.01); *F02K 1/66* (2013.01); *F05D 2220/323* (2013.01); *F05D 2270/05* (2013.01); *F05D 2270/07* (2013.01); *F05D 2270/08* (2013.01); *F05D 2270/101* (2013.01); *F05D 2270/112* (2013.01); *F05D 2270/333* (2013.01)

(58) Field of Classification Search
CPC .... F02C 9/20; F02C 9/54; F02C 9/254; F02C 7/042; F02C 9/58; F02K 1/66; F02K 3/06; F05D 2250/90; F05D 2270/10; F05D 2270/101; F05D 2270/051; F05D 2270/07; F05D 2270/08; F05D 2270/093; F05D 2270/095; F05D 2270/112; F05D 2270/20; F05D 2270/333; F05D 2220/36; F05D 2260/70; F05D 2260/74; F05D 2270/121; F05D 2270/122; F05D 2260/961; F05D 2260/71; F05D 2260/75–79; B64C 2201/048; Y02T 50/6673; Y02T 50/677; Y02T 50/66
See application file for complete search history.

(56) References Cited

U.S. PATENT DOCUMENTS 3,932,058 A * 1/1976 Harner ...................... F02C 9/44
416/28
3,987,279 A * 10/1976 Borelan ............... G05D 1/0066
701/99

(Continued)

OTHER PUBLICATIONS

Wendus et al., "Follow-On Technology Requirement Study for Advanced Subsonic Transport", Aug. 2003, NASA/CR-2003-212467 (Year: 2003).*

(Continued)

*Primary Examiner* — Stephanie Sebasco Cheng
(74) *Attorney, Agent, or Firm* — Barnes & Thornburg LLP

(57) ABSTRACT

A gas turbine engine includes a fan and an engine core that includes a compressor, a combustor, and a turbine. The fan and the compressor include variable pitch geometry. The gas turbine engine further includes a control system configured to adjust the variable pitch geometry of the fan and the compressor to optimize a performance characteristic of the gas turbine engine.

9 Claims, 9 Drawing Sheets

(56) References Cited

U.S. PATENT DOCUMENTS

| | | | |
|---|---|---|---|
| 4,258,545 A | | 3/1981 | Slater |
| 4,292,802 A | * | 10/1981 | Snow ................. F02K 3/075 |
| | | | 60/204 |
| 4,947,643 A | * | 8/1990 | Pollak ................ F02C 9/28 |
| | | | 60/236 |
| 6,628,995 B1 | * | 9/2003 | Korson ............... G01D 9/005 |
| | | | 244/3.21 |
| 6,789,390 B2 | | 9/2004 | Hu et al. |
| 9,342,060 B2 | | 5/2016 | Fuller et al. |
| 9,759,132 B2 | | 9/2017 | Khalid |
| 9,771,878 B2 | * | 9/2017 | Lu ..................... F02C 9/44 |
| 9,776,714 B2 | * | 10/2017 | Shapery ............. B64C 29/0075 |
| 9,777,642 B2 | * | 10/2017 | Murrow .............. F02C 7/042 |
| 9,853,581 B2 | | 12/2017 | Armstrong et al. |
| 9,963,981 B2 | | 5/2018 | Joshi et al. |
| 10,054,133 B2 | * | 8/2018 | Julienne ............. F04D 29/325 |
| 2014/0236534 A1 | | 8/2014 | Ling et al. |
| 2015/0192298 A1 | | 7/2015 | Hasel et al. |
| 2017/0218854 A1 | * | 8/2017 | Nestico .............. F04D 29/542 |
| 2017/0218975 A1 | | 8/2017 | Blintz et al. |
| 2017/0284304 A1 | | 10/2017 | Nestico et al. |
| 2019/0017409 A1 | * | 1/2019 | Yardibi ............... F02C 9/00 |

OTHER PUBLICATIONS

D.G.M. Davies and D.C. Miller, "A Variable Pitch Fan for an Ultra Quiet Demonstrator Engine", 1971, Seeds for Success in Civil Aircraft Design in the Next Two Decades, 1976 Spring Convention, Royal Aeronautical Society, pagemarked GE Exhibit 1011.001-023 (Year: 1971).*

\* cited by examiner

GAS TURBINE ENGINE WITH VARIABLE PITCH FAN AND VARIABLE PITCH COMPRESSOR GEOMETRY

STATEMENT REGARDING FEDERALLY SPONSORED RESEARCH OR DEVELOPMENT

Embodiments of the present disclosure were made with government support under NASA Contract No. NNC14CA29C. The government may have certain rights.

FIELD OF THE DISCLOSURE

The present disclosure relates generally to gas turbine engines, and more specifically to gas turbine engines having variable pitch fan and variable pitch compressor geometry.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

SUMMARY

The present disclosure may comprise one or more of the following features and combinations thereof.

A gas turbine engine may include a variable pitch fan, an engine core, and a control system. The variable pitch fan may be mounted for rotation about a center axis. The variable pitch fan may include a plurality of variable-pitch fan blades that extend radially outward relative to the center axis along a plurality of fan-pitch axes that correspond with the plurality of variable-pitch fan blades. Each of the plurality of variable-pitch fan blades may be configured to rotate selectively about the corresponding fan-pitch axis. The engine core may include a compressor, a combustor, and a turbine. The compressor may include a plurality of variable-pitch compressor vanes that extend radially outward relative to the center axis along a plurality of compressor-pitch axes that correspond with the plurality of variable-pitch compressor vanes. Each of the plurality of variable-pitch compressor vanes may be configured to rotate selectively about the corresponding compressor-pitch axis.

The control system may be configured to rotate the plurality of variable-pitch fan blades to specific fan-pitch angles and to rotate the plurality of variable-pitch compressor vanes to specific vane-pitch angles to optimize a selected at least one of a plurality of engine performance characteristics of the gas turbine engine during operation of the gas turbine engine at a given operating condition of the gas turbine engine. The control system may be configured to select the specific fan-pitch angles from a range of fan-pitch angles that are bounded by preset operating limits of the gas turbine engine at the given operating condition and to select the specific vane-pitch angles from a range of vane-pitch angles that are bounded by the preset operating limits of the gas turbine engine at the given operating condition.

In some embodiments, the selected at least one of the plurality of engine performance characteristics may be at least one of specific fuel consumption of the gas turbine engine, thrust produced by the gas turbine engine, an inlet temperature of the turbine, noise of the gas turbine engine, and emissions of the gas turbine engine. In some embodiments, the given operating condition includes at least one of an altitude of the gas turbine engine, a flight Mach number of the gas turbine engine, throttle setting, and ambient temperature.

In some embodiments, the preset operating limits of the gas turbine engine at the given operating condition may include at least one of surge limits of the compressor, surge limits of the fan, torque limits of the turbine, and temperature limits of the engine core.

In some embodiments, the control system may be configured to rotate the plurality of variable-pitch fan blades about the plurality of fan-pitch axes independent of the plurality of variable-pitch compressor vanes. The control system may be configured to rotate the plurality of variable-pitch compressor vanes about the plurality of compressor-pitch axes independent of the plurality of variable-pitch fan blades.

In some embodiments, the turbine may include at least a high pressure stage turbine and a low pressure stage turbine that is rotatable independent of the high pressure stage turbine. The compressor may include an intermediate pressure compressor and a high pressure stage compressor that is rotatable independent of the intermediate pressure stage compressor, and the low pressure turbine drives the intermediate pressure stage compressor and the variable pitch fan.

In some embodiments, the selected at least one of the plurality of engine performance characteristics may be thrust produced by the gas turbine engine. The range of fan-pitch angles and the range of vane-pitch angles for the given operating condition of the gas turbine engine may be based on a surge limit of the compressor and a surge limit of the variable-pitch fan.

In some embodiments, the selected at least one of the plurality of engine performance characteristics being optimized may be based on a phase of a flight cycle the gas turbine engine is operating within. In some embodiments, the preset operating limits of the gas turbine engine at the given operating condition may be included in a look-up table stored in the control system.

In some embodiments, the control system may be configured to receive data indicative of the given operating condition of the gas turbine engine and the data may be indicative of another gas turbine engine being inoperable.

In some embodiments, the selected at least one of the plurality of engine performance characteristics may be a minimal turbine inlet temperature. In some embodiments, the selected at least one of the plurality of engine performance characteristics may be an emissions of the gas turbine engine.

In some embodiments, the selected at least one of the plurality of engine performance characteristics may be minimal engine noise. The given operating condition of the gas turbine engine may be one of taxi, take-off, and landing.

A method of optimizing performance of a gas turbine engine having a fan with variable pitch fan blades and a compressor with variable pitch vanes in accordance with the present disclosure may include a number of steps. The method may include providing the fan with variable pitch fan blades and the compressor with variable pitch vanes, identifying an operating condition of the gas turbine engine, identifying an engine performance characteristic of the gas turbine engine to be optimized, and varying a pitch angle of the variable pitch fan blades while independently varying a pitch angle of the variable pitch vanes to configure the variable pitch fan blades and the variable pitch vanes to optimize the engine performance characteristic for the operating condition.

In some embodiments, the method may include selecting a specific fan blade pitch angle from a range of fan blade pitch angles that are bounded by preset operating limits of the gas turbine engine at the operating condition. The method may include selecting a specific compressor vane pitch angle from a range of compressor vane pitch angles that are bounded by the preset operating limits of the gas turbine engine at the operating condition.

In some embodiments, the engine performance characteristic may be selected based on a phase of a flight cycle in which the gas turbine engine is operating. In some embodiments, the method may include rotatably coupling the fan and an intermediate pressure stage included in the compressor.

In some embodiments, the engine performance characteristic may be a specific fuel consumption of the gas turbine engine which is optimized by minimizing the specific fuel consumption and the operating condition is one of climb and cruise. In some embodiments, the engine performance characteristic may be an inlet temperature of a turbine and the operating condition is one of takeoff and climb.

In some embodiments, the engine performance characteristic may be at least one of specific fuel consumption of the gas turbine engine, thrust produced by the gas turbine engine, an inlet temperature of the turbine, noise of the gas turbine engine, and emissions of the gas turbine engine. In some embodiments, the operating condition may include one of an altitude of the gas turbine engine, flight Mach number of the gas turbine engine, throttle setting, and ambient temperature.

These and other features of the present disclosure will become more apparent from the following description of the illustrative embodiments.

DETAILED DESCRIPTION OF THE DRAWINGS

Figure 1:
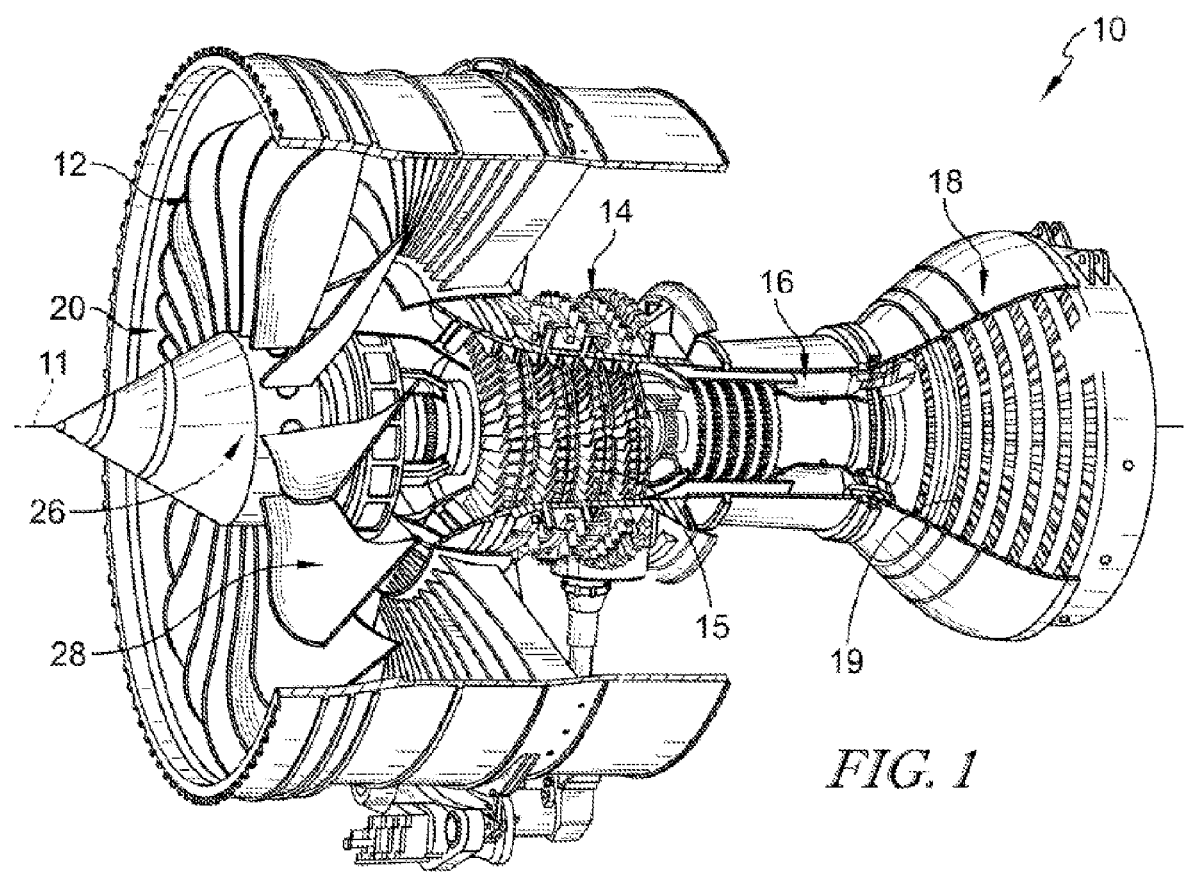
FIG. 1 is a cutaway view of a gas turbine engine in accordance with the present disclosure that includes a variable pitch fan, a compressor having variable pitch vanes, a combustor, a turbine, and a controller configured to adjust the variable pitch fan blades and the variable pitch compressor vanes to optimize selectively one of a plurality of desired parameters.

For the purposes of promoting an understanding of the principles of the disclosure, reference will now be made to a number of illustrative embodiments illustrated in the drawings and specific language will be used to describe the same.

Recognizing that the pitch angle of the variable pitch fan blades and variable guide vanes of the compressor may both be adjusted to optimize one or more engine performance characteristics, the present disclosure provides a control system and methods for optimizing the engine operation for improved performance by controlling fan blade pitch while simultaneously controlling compressor pitch to thereby optimize a selected particular engine performance characteristic for a given engine condition. As such, an engine 10 of the present disclosure may be optimized for one engine performance characteristic during one phase of a flight cycle while optimizing a different characteristic during a different phase of the flight cycle.

A gas turbine engine 10 in accordance with the present disclosure is shown in FIG. 1. The gas turbine engine 10 includes a fan 12, a compressor 14, a combustor 16, and a turbine 18. The compressor 14, combustor 16, and turbine 18 cooperate to form an engine core 21 of the gas turbine engine 10. The fan 12 is driven by the turbine 18 and provides thrust for propelling an aircraft. The compressor 14 compresses and delivers air to the combustor 16. It should be understood that the compressor 14 may include more than one stage, such as a low pressure compressor (LPC), an intermediate pressure compressor (IPC), and a high pressure compressor (HPC). The discussion of the compressor 14 herein is directed to the compressor 14 in general, but may also be applicable to a specific stage of the compressor 14. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 of the gas turbine engine 10 and drive the compressor 14 and the fan 12.

Figure 2:
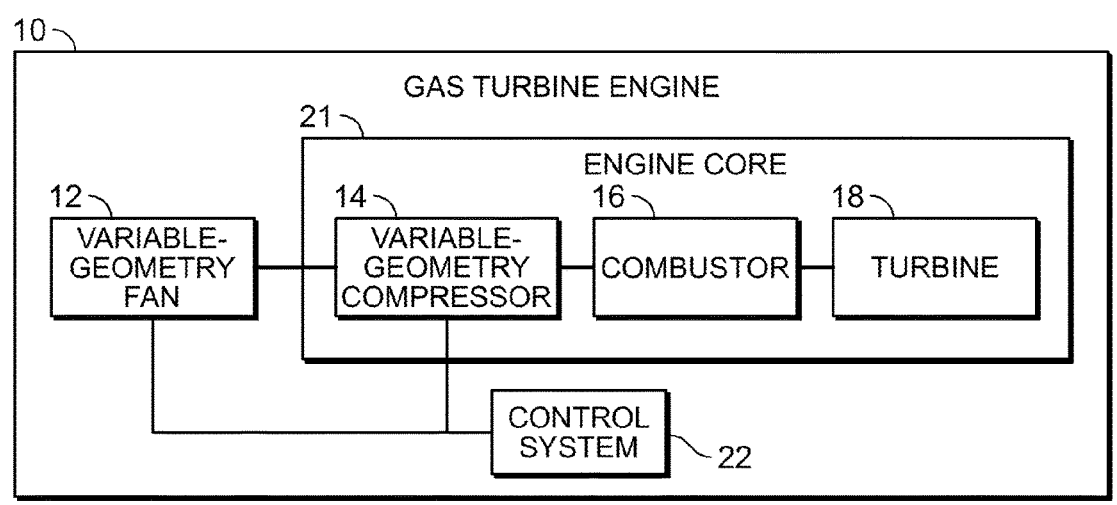
FIG. 2 is a diagrammatic representation of the gas turbine engine of FIG. 1.
Figure 3:
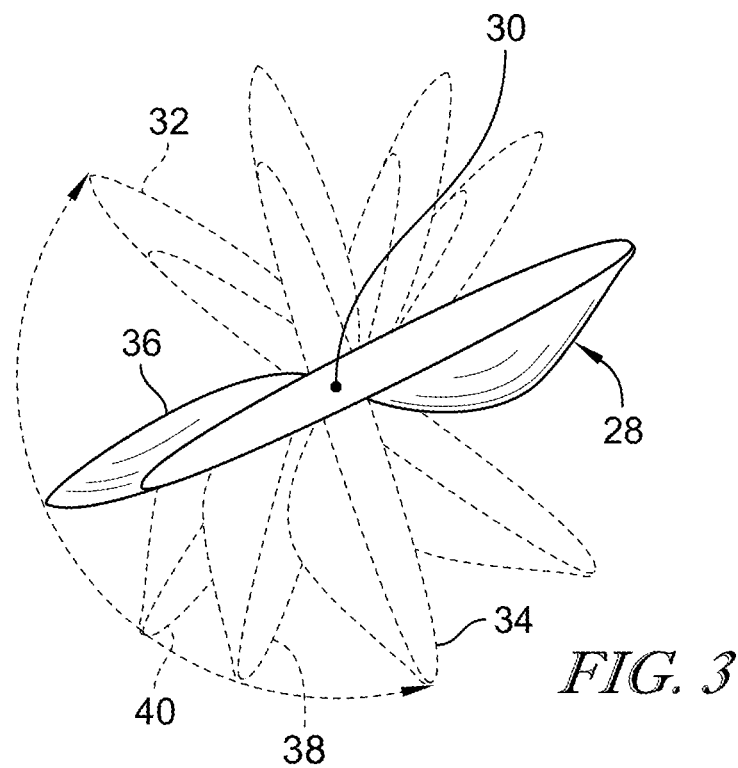
FIG. 3 is an end view of one of the fan blades of the fan of the engine of FIG. 1, the fan blade having an adjustable pitch angle between a minimum negative pitch angle and a maximum positive pitch angle.

The illustrative fan 12 is a variable-pitch fan 12 that includes a plurality of fan blades 28 and a pitch controller 22 both mounted to rotate about the central axis 11 as shown in FIGS. 1 and 2. The fan blades 28 are arranged circumferentially about the central axis 11 and are configured to rotate about corresponding radially extending fan-blade pivot axes 30 to change a pitch (sometimes called an incident angle) of the fan blades 28 as suggested in FIGS. 2 and 3. The control system 22 is configured to vary and set the pitch of the fan blades 28 for different operating conditions during use of the gas turbine engine 10. As one example, the pitch of the fan blades 28 may be varied to optimize fuel burn throughout a flight mission.

Figure 4:
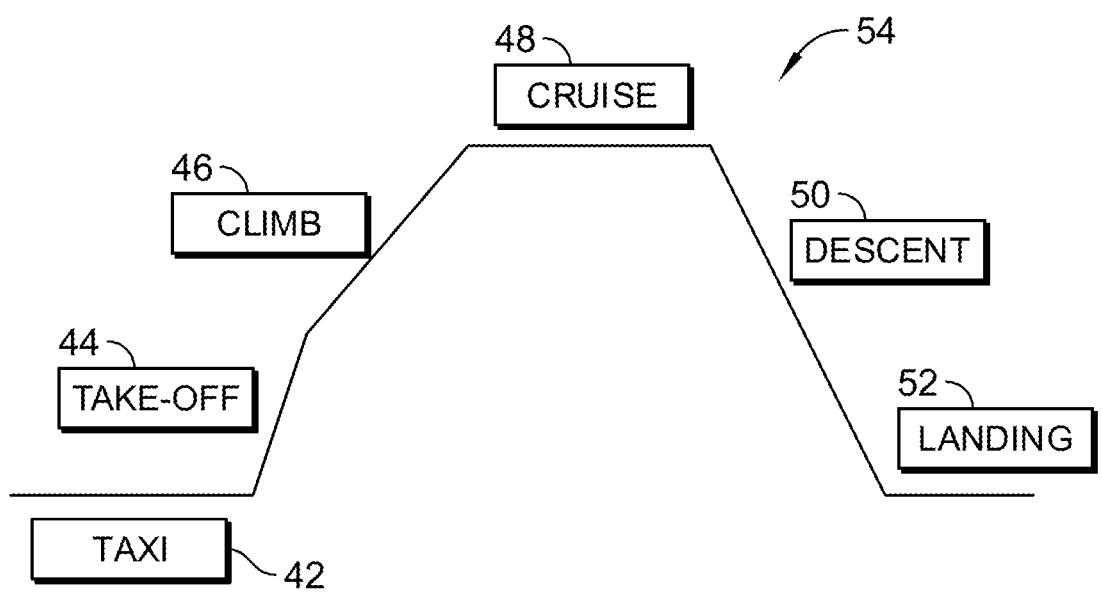
FIG. 4 is a diagrammatic representation of the phases of a flight cycle experienced by an aircraft equipped with the gas turbine engine of FIG. 1.

The illustrative fan rotor 20 includes a fan disk 26 and a plurality of fan blades 28 as shown in FIGS. 2 and 4. The fan blades 28 extend radially outward away from the fan disk 26 relative to the central axis 11 along radially extending fan-blade pivot axes 30 as shown in FIG. 2. Each fan blade 28 is configured to rotate selectively about its corresponding fan-blade pivot axis 30 between and including a reverse thrust position 32 and a closed position 34 to vary the pitch of the fan blade 28 as suggested in FIG. 3. The fan-blade pivot axis 30 is perpendicular to the central axis 11. The fan blades 28 are rotatable between a plurality of positions between the reverse thrust position 32 and the closed position 34, including, for example, a feather position 36, a max takeoff (MTO) position 38, and a top of climb (TOC) position 40 as suggested in FIG. 3. The position of the fan blades 28 for different flight stages and engine operating conditions, such as max takeoff and top of climb, may be selected to optimize one or more of the selected engine performance characteristics.

In the present disclosure, the compressor 14 includes variable pitch vanes 15 which are adjustable to operate the compressor 14 efficiently over its full speed range. The variable pitch vanes 15 are used to correct the angle of incidence of the air onto a stage of turbine blades 19 to angles which the turbine blades 19 tolerate without a break down of flow, stall or surge at relatively low compressor pressure ratios and compressor rotor speeds.

In illustrative embodiments, the turbine includes at least the high pressure stage turbine and the low pressure stage turbine (relative to the high pressure stage) that is rotatable independent of the high pressure stage turbine. The compressor includes the high pressure stage compressor and the intermediate pressure stage compressor that is rotatable independent of the high pressure stage compressor. In the illustrative embodiment, the low pressure stage turbine drives the intermediate pressure stage compressor and the variable pitch fan. As a result, the pitch angle of the fan directly correlates with the rotational speed of the intermediate stage compressor which may allow for more control of the design space when optimizing a parameter. Thus, the characteristics of the compressor may be directly altered by the fan blade pitch angles.

In some embodiments, the fan and the intermediate pressure stage compressor are connected with the low pressure turbine via a gear box. As a result, the fan and the intermediate pressure stage compressor rotate relative to each other at a fixed ratio of speeds. In other embodiments, the fan and the intermediate pressure stage compressor are coupled on the same shaft. In other embodiments, the fan and intermediate pressure stage compressor are independently rotatable relative to each other.

In some instances, the variable geometry of a fan 12 has been used to maintain a constant engine speed while varying the thrust developed by the fan 12. In other instances, a variable pitch vane 15 arrangement in a compressor 14 has been used to maintain stability of the compressor 14 under different pressure ratios. In the present disclosure, the variable geometry of the fan 12 and the compressor 14 is coordinated by the control system 22. Coordinating the operation of the compressor vanes 15 and the fan blades 28 allows the optimization of a selected one or more of various engine operating characteristics such as specific fuel consumption (SFC), thrust, turbine inlet temperature, engine noise, engine operability, or emissions.

Referring now to FIG. 4, the typical flight cycle 54 of an aircraft using an engine 10 is illustrated. The engine 10 experiences different operating phases. The taxi phase 42 has minimal thrust requirements, but noise or emissions may be minimized in the taxi phase 42. In some embodiments, thrust is selected to be optimized and, thus, maximized at the take-off phase 44. In some embodiments, the inlet temperature to the turbine is selected to be optimized and, thus, minimized at the take-off phase 44. The density of the air during the taxi phase 42 and take-off phase 44 is relatively high, such that the compressor 14 may operate at a lower compression ratio.

During the phases of airborne flight, the air temperature and density change, as well as the needed thrust. During a climb phase 46, the thrust must be maintained while the air temperature and density drops. At the cruise phase 48, the engine 10 is operated at a relatively steady state with thin air and low air temperatures. In some embodiments, specific fuel consumption and emissions is minimized during the cruise phase 48, while providing sufficient thrust to meet the flight speed expectations. In other embodiments, the specific fuel consumption may be selected to be optimized and, thus, minimized, during other phases such as, for example, climb or descent. During a descent phase 50, the engine 10 experiences increasing air density as well as increasing air temperature, while experiencing a lower thrust load.

Finally, during a landing phase 52, noise is minimized while the fan 12 pitch is varied to control thrust for landing and reverse thrust to help slow the aircraft on the ground in some embodiments. In some embodiments, the engine emissions are selected to be minimized during the landing phase 52 such as, for example, during an approach portion of the landing phase. The pitch angles may be selected for reverse thrust after the wheels of the aircraft touch ground. Thus, it can be seen that the normal flight cycle 54 that the demands placed on the engine 10 vary considerably. It should also be understood that a typical flight cycle 54 may include multiple climb phases 46 and descent phases 50 as the aircraft is moved through various altitudes for air traffic control and to avoid weather patterns or turbulent air.

The operation of the engine 10 is controlled according to predetermined criteria for the various phases 42, 44, 46, 48, 50, 52 of the flight cycle 54 so as to meet various engine operating characteristics such as rating limits for safety, engine life maximization, or contractual limits imposed by a user of the engine 10. For any given operating condition, i.e. altitude, flight Mach number, throttle setting, ambient temperature, etc., the variable geometry of the fan 12 and compressor 14 is set to optimize at least one operating characteristic, such as specific fuel consumption, for example. This optimization occurs within any required limits, such as mechanical and corrected speeds, stability limits, temperature limits, torque limits, and loading of various blades. The limits may be steady state limits or transient limits.

In some cases, the variable geometry is over-ruled by other requirements at any given operating condition, if necessary. For example, the variable geometry could also be used to maximize available thrust during a one-engine-out situation, minimize turbine inlet temperature during key high-temperature conditions, minimize engine noise during take-off and landing conditions. In one embodiment, the engine controller includes a real-time-model run with real-time simulation and optimization that responds to environmental inputs, engine operating information, and user inputs to match the geometry of the fan blades 28 and the compressor vanes 15 to optimize a predetermined objective function. The objective function is set or changed by the pilot in real time during operation, or set to specific parameters ahead of time, based on the expected flight conditions. In other embodiments, the operating characteristics of the engine 10 may be controlled by using tables that are referenced by the control system 22 under various flight conditions.

Figure 5:
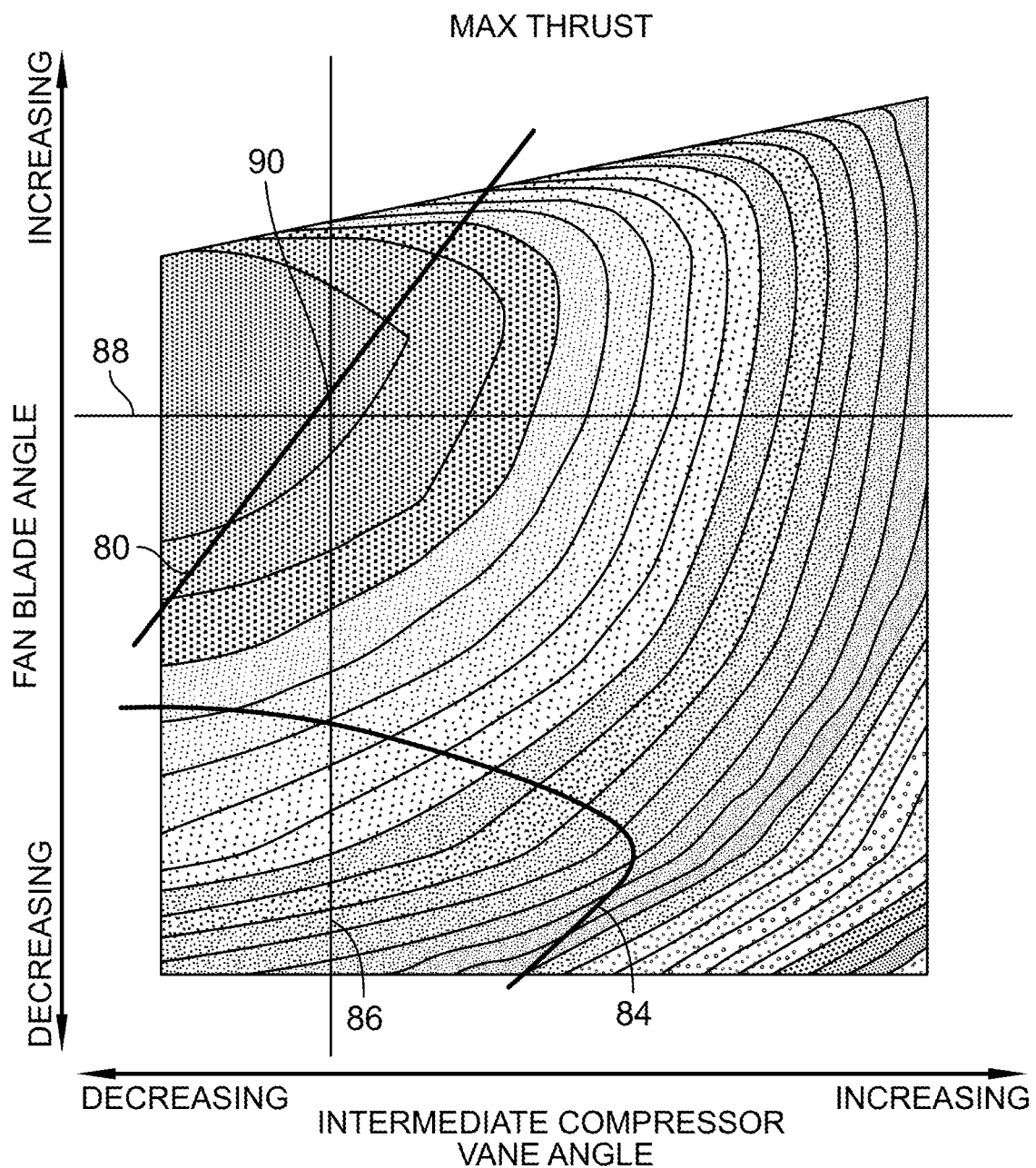
FIG. 5 is a graph showing the max thrust of the gas turbine engine of FIG. 1 for different combinations of fan blade and compressor vane angles for a given operating condition of the engine and further showing limits that bound the range of fan blade and compressor angles for that operating condition.

A number of charts are shown in FIGS. 5-11 for different engine performance characteristics that may be optimized. In each chart, the x-axis corresponds to a pitch angle of the compressor vanes 15 in the intermediate pressure stage of the compressor 14 while the y-axis corresponds to the pitch angle of the fan blade 28. The chart is bounded on the left by a low limit of the vane pitch angle and the right by a high limit of the vane pitch angle. In some embodiments, the range between the lower and upper limits of the vane angles is about 60 degrees. The chart is bounded on the top by a maximum blade angle and on the bottom by a lower blade angle. In some embodiments, the range between the lower and upper limits of the fan blade angles is about 45 degrees The graph of FIG. 5 illustrates max thrust for the different ranges of fan blade angles and compressor vane angles. In the illustrative performance characteristic of max thrust, the ranges of angles for the fan blades and compressor vanes are bounded by a fan surge limit and an intermediate pressure compressor surge limit, respectively.

An optimal fan blade pitch angle and compressor vane pitch angle for max thrust at the given operating condition and limits of the engine 10 is indicated as point 90 which is the intersection of the optimal fan blade pitch angle 88 and the optimal compressor vane pitch angle 86. The optimal pitch angels may be chosen from a small range of optimal angles around the point 90 in some embodiments. The max thrust performance characteristic may be selected, for example, at take-off or climb. The max thrust performance characteristic may be selected, for example, if the controller receives or determines data indicative of a one-engine out on the aircraft such that the gas turbine engine 10 needs to compensate for lost thrust from another engine on the aircraft.

Figure 6:
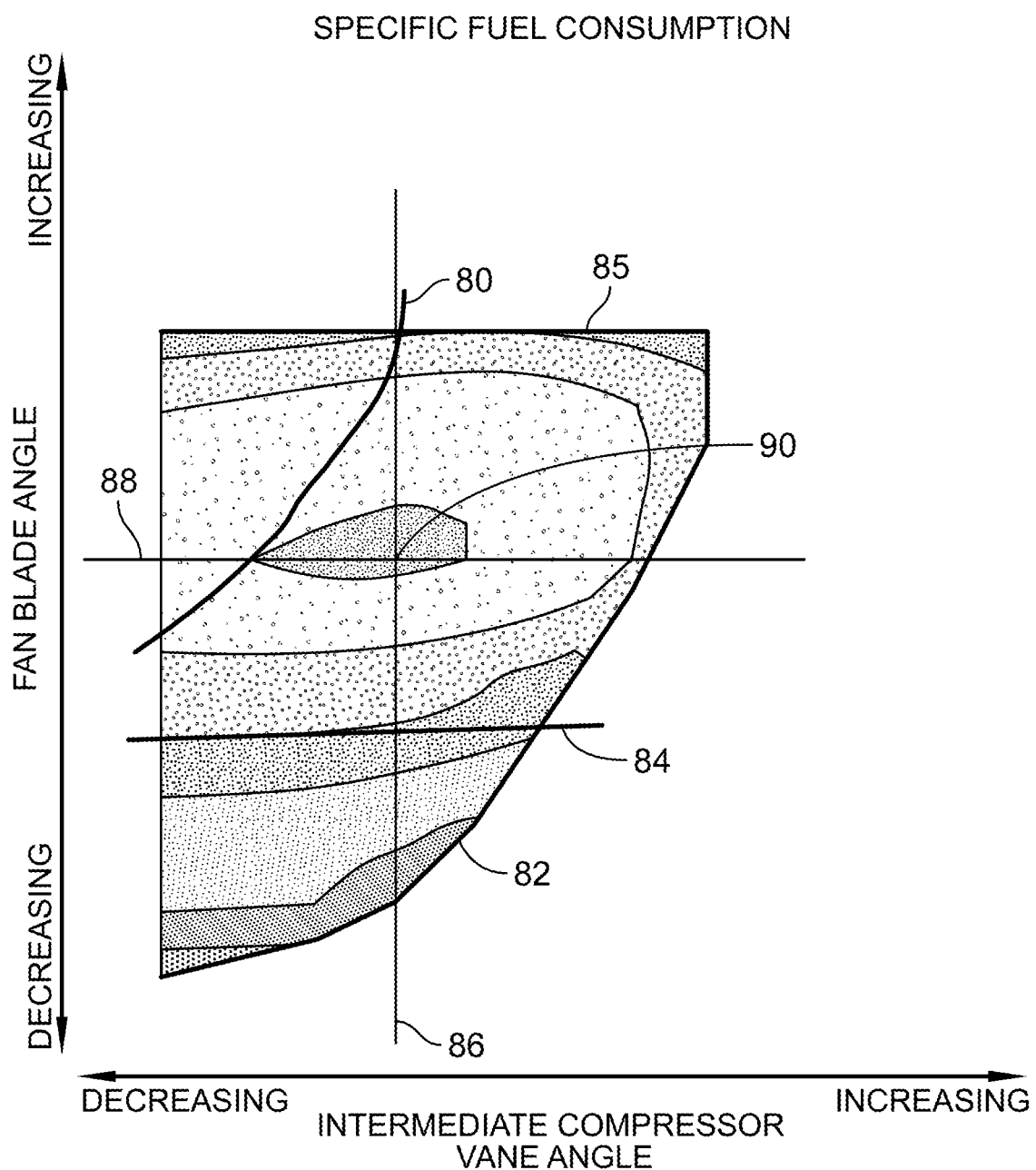
FIG. 6 is a graph showing the specific fuel consumption of the gas turbine engine of FIG. 1 for different combinations of fan blade and compressor vane angles for a given operating condition of the engine and further showing limits that bound the range of fan blade and compressor angles for that operating condition.

The graph of FIG. 6 illustrates specific fuel consumption for the different ranges of fan blade angles and compressor vane angles. When being optimized, minimum specific fuel consumption is desired. The specific fuel consumption may be optimized during climb, cruise, and/or descent.

In the illustrative performance characteristic of specific fuel consumption, the ranges of angles for the fan blades and compressor vanes are bounded by the intermediate pressure compressor surge limit 80, the fan surge limit 84, and the high pressure compressor corrected rotational speed limit 82. The max fan blade pitch angle is bounded by a fan corrected speed (Nc) limit 85. An optimal fan blade pitch angle and compressor vane pitch angle for minimizing specific fuel consumption at the given operating condition and limits of the engine 10 is indicated as point 90 which is the intersection of the optimal fan blade pitch angle 88 and the optimal compressor vane pitch angle 86. The optimal pitch angels may be chosen from a small range of optimal angles around the point 90 in some embodiments.

Figure 7:
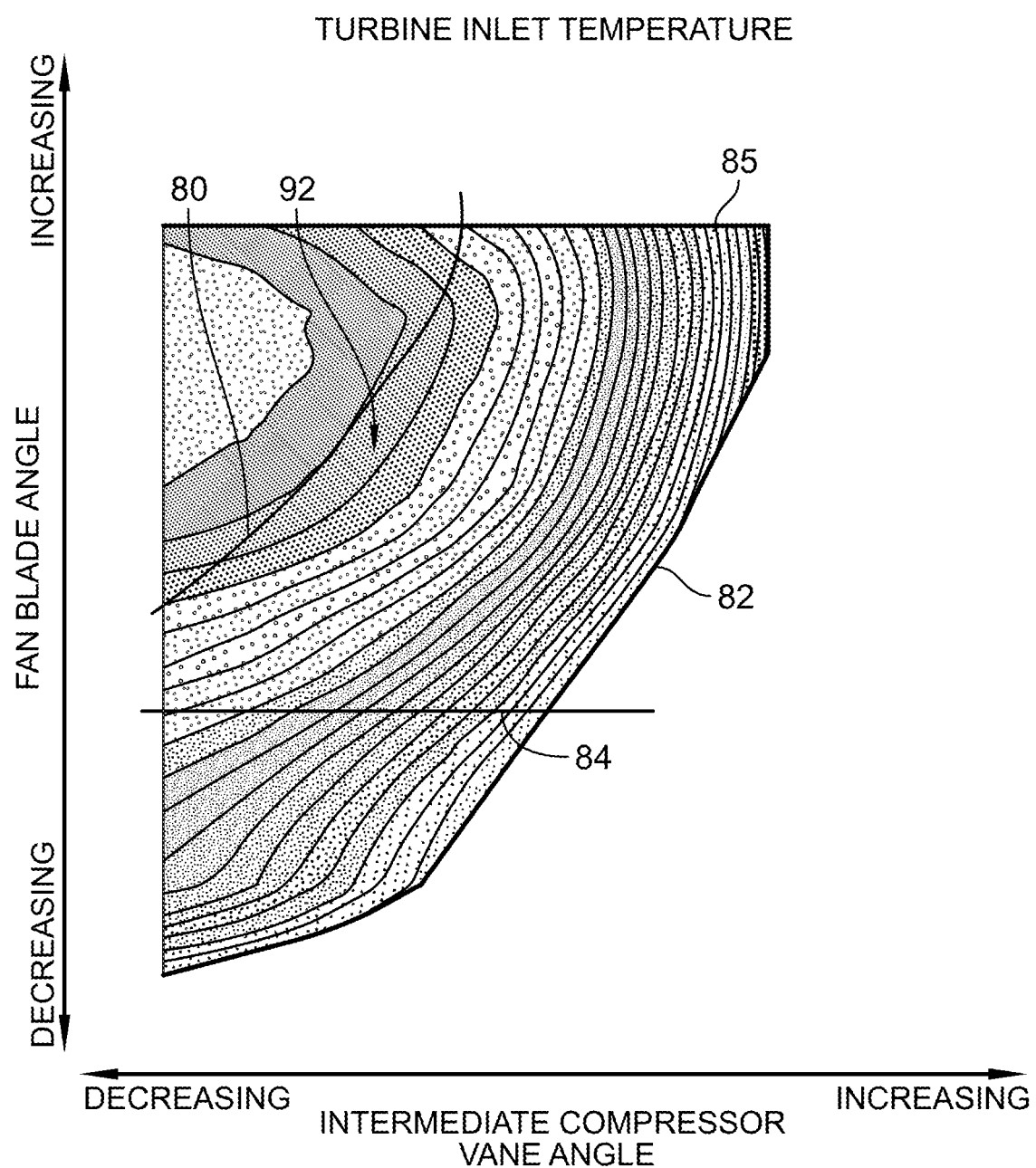
FIG. 7 is a graph showing the minimal turbine inlet temperature of the gas turbine engine of FIG. 1 for different combinations of fan blade and compressor vane angles for a given operating condition of the engine and further showing limits that bound the range of fan blade and compressor angles for that operating condition.

The graph of FIG. 7 illustrates turbine inlet temperature for the different ranges of fan blade angles and compressor vane angles. When being optimized, minimum turbine inlet temperature may be desired. In the illustrative performance characteristic of turbine inlet temperature, the ranges of angles for the fan blades and compressor vanes are bounded at least by the high pressure compressor rotational speed limit 82. The max fan blade pitch angle is bounded by a fan corrected speed (Nc) limit 85. An optimal fan blade pitch angle range and compressor vane pitch angle range for minimizing turbine inlet temperature at the given operating condition and limits of the engine 10 is indicated by range 92. The turbine inlet temperature may be selected to be optimized and, thus, minimized, during key high-temperature conditions. The turbine inlet temperature may be optimized and, thus, minimized during takeoff or climb.

Figure 8:
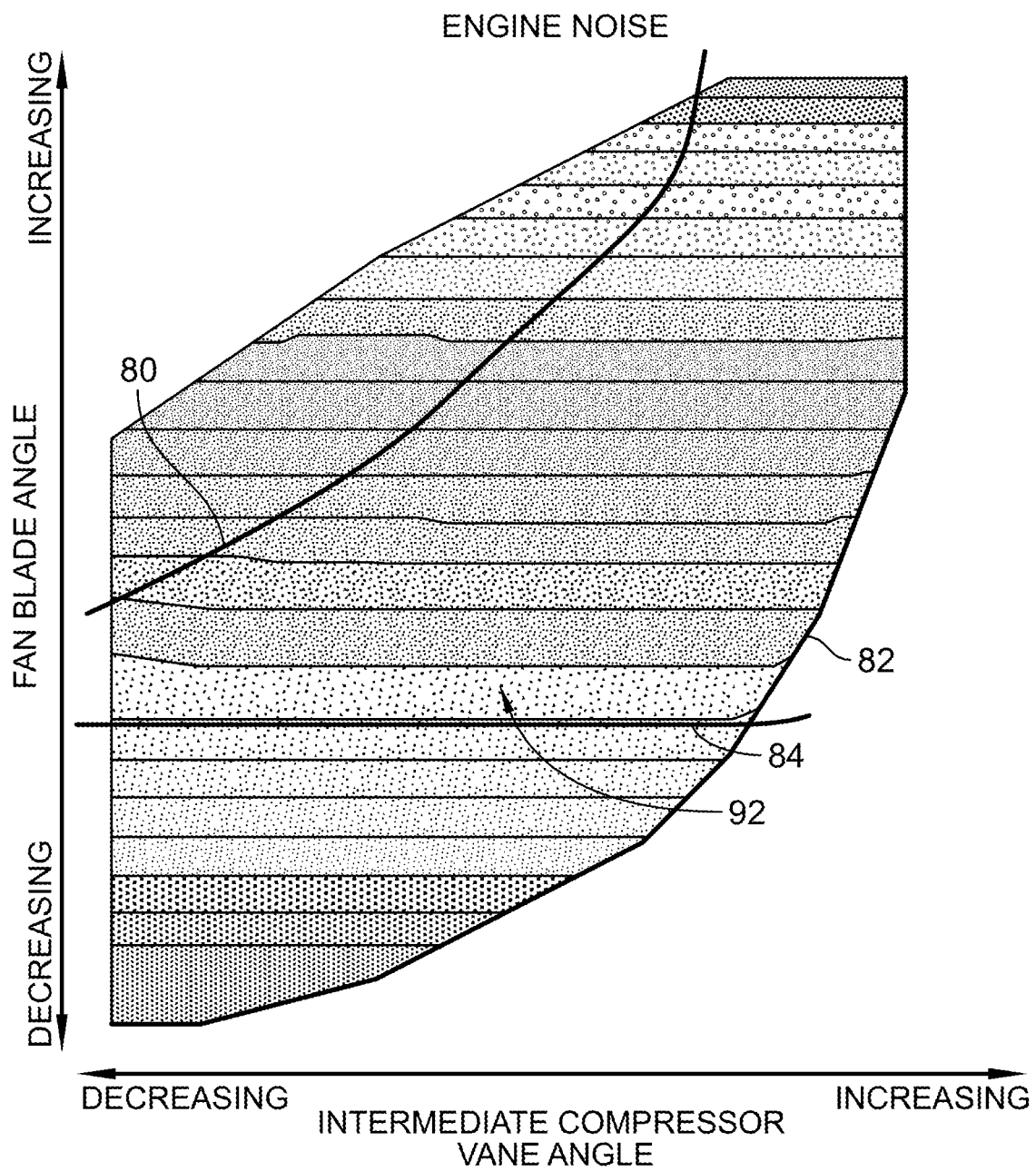
FIG. 8 is a graph showing noise of the gas turbine engine of FIG. 1 for different combinations of fan blade and compressor vane angles for a given operating condition of the engine and further showing limits that bound the range of fan blade and compressor angles for that operating condition.

The graph of FIG. 8 illustrates engine noise for the different ranges of fan blade angles and compressor vane angles. In the illustrative performance characteristic of engine noise, the ranges of angles for the fan blades and compressor vanes are bounded by the intermediate pressure compressor surge limit 80 and the high pressure compressor rotational speed limit 82. An optimal fan blade pitch angle and compressor vane pitch angle for reducing engine noise at the given operating condition and limits of the engine 10 is indicated as range 92. The engine noise performance characteristic may be selected, for example, at taxi to reduce engine noise on the ground. The engine noise performance characteristic may be selected to be minimized, for example, at take-off and landing. The noise may be determined or based on a fan tip Mach number. In some embodiments, only the fan blade pitch angles are used to optimize engine noise as suggested in FIG. 8. As a result, the compressor vane pitch angles may be set to the optimal vane pitch angle for another parameter other than engine noise.

Figure 9:
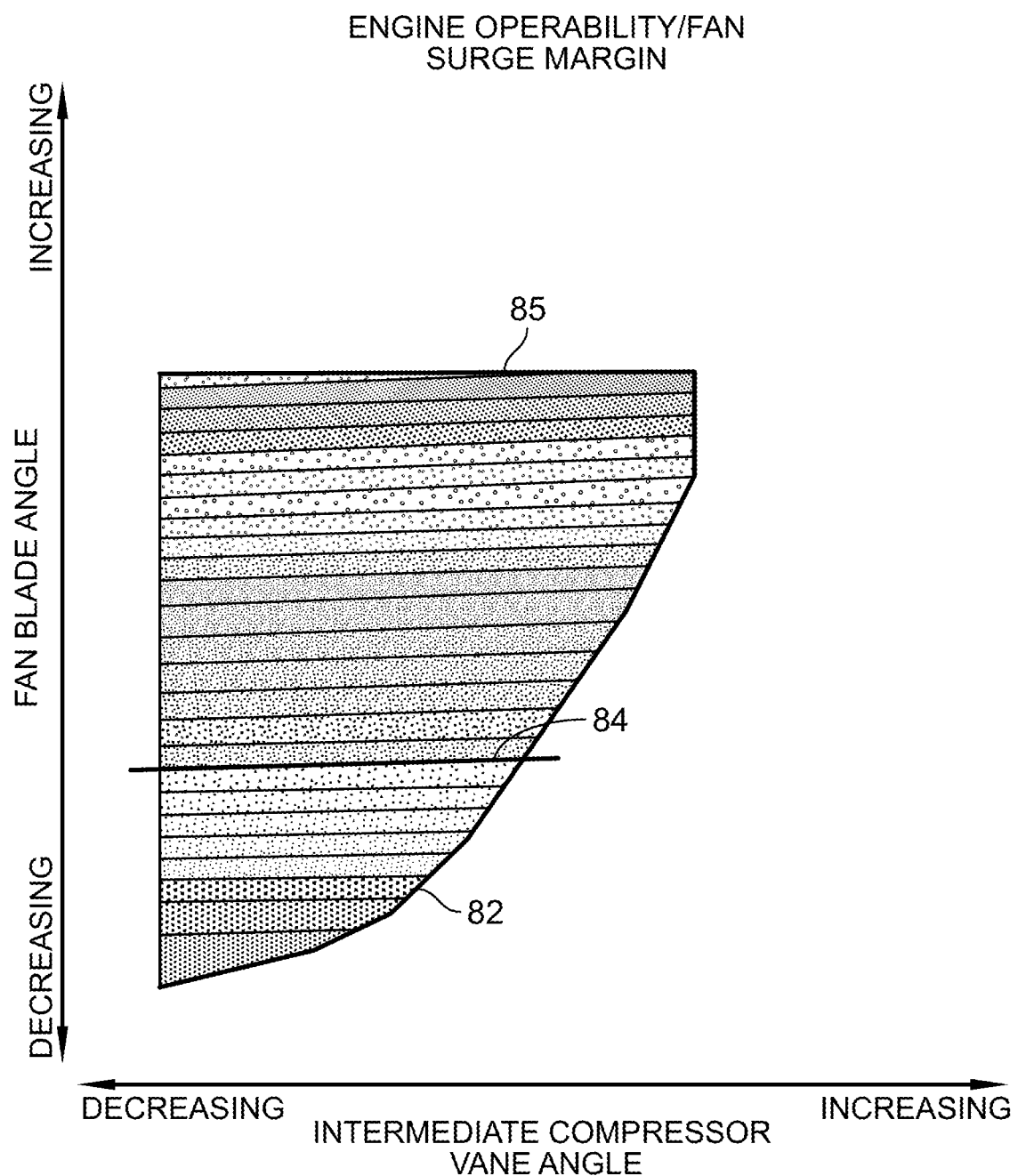
FIG. 9 is a graph showing the engine operability/fan surge margin of the gas turbine engine of FIG. 1 for different combinations of fan blade and compressor vane angles for a given operating condition of the engine and further showing limits that bound the range of fan blade and compressor angles for that operating condition.

The graph of FIG. 9 illustrates engine operability as based on fan surge margin for the different ranges of fan blade angles and compressor vane angles. The ranges of angles for the fan blades and compressor vanes are bounded by the fan surge limit 84 and the high pressure compressor rotational speed limit 82. The max fan blade pitch angle is bounded by a fan corrected speed (Nc) limit 85. The fan surge limit 84 may be moved depending on requirements for a given flight condition, flight phase, engine operation condition, and/or known engine threat such as, for example, crosswinds, ambient temperature, altitude, etc.

Figure 10:
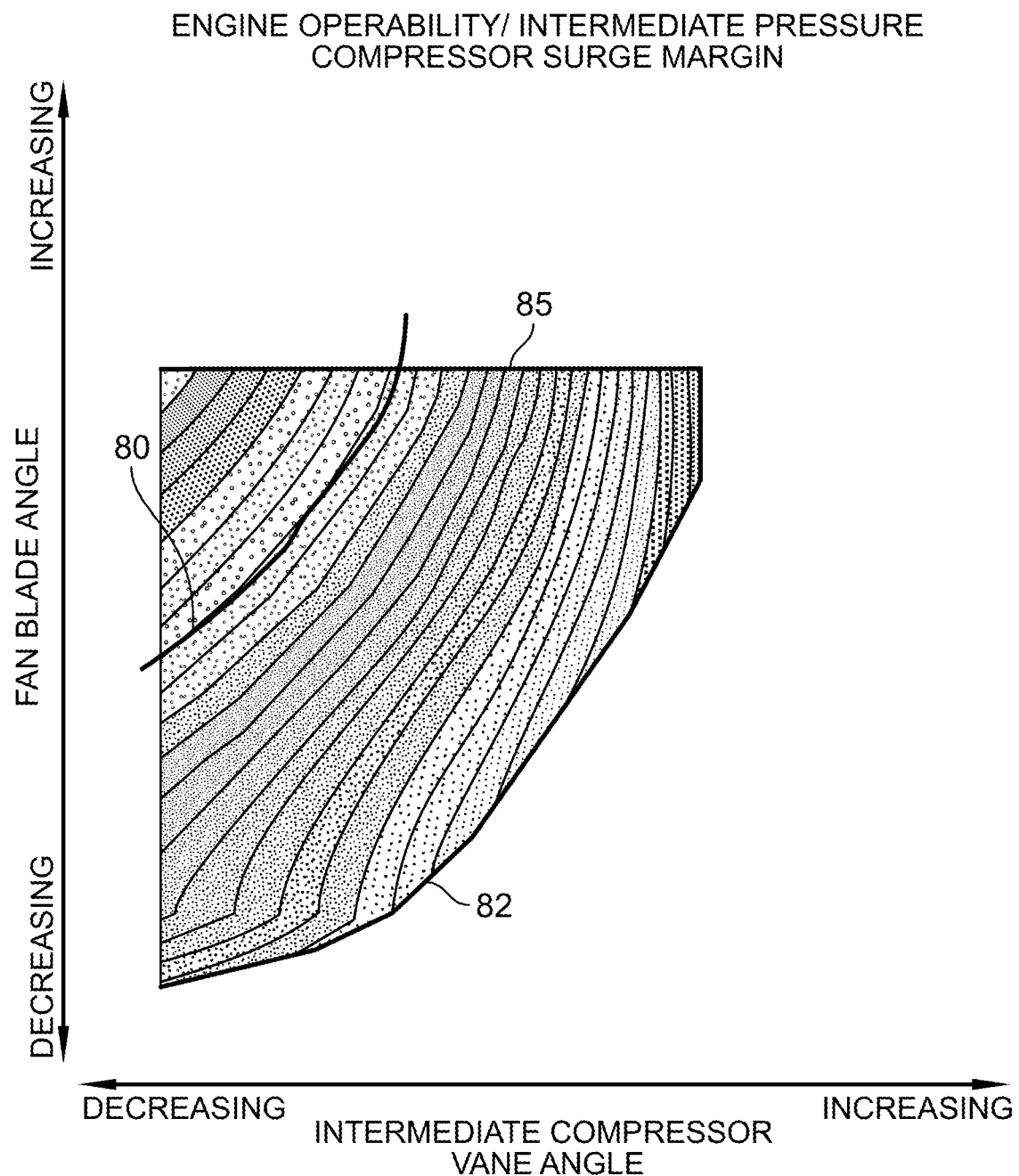
FIG. 10 is a graph showing the engine operability/booster surge margin of the gas turbine engine of FIG. 1 for different combinations of fan blade and compressor vane angles for a given operating condition of the engine and further showing limits that bound the range of fan blade and compressor angles for that operating condition.

The graph of FIG. 10 illustrates engine operability as based on intermediate pressure compressor surge margin for the different ranges of fan blade angles and compressor vane angles. The ranges of angles for the fan blades and compressor vanes are bounded by the compressor surge limit 80 and the high pressure compressor rotational speed limit 82. The max fan blade pitch angle is bounded by a fan corrected speed (Nc) limit 85. The compressor surge limit 80 may be moved depending on requirements for a given flight condition, flight phase, engine operation condition, and/or known engine threat such as, for example, crosswinds, ambient temperature, altitude, etc.

Figure 11:
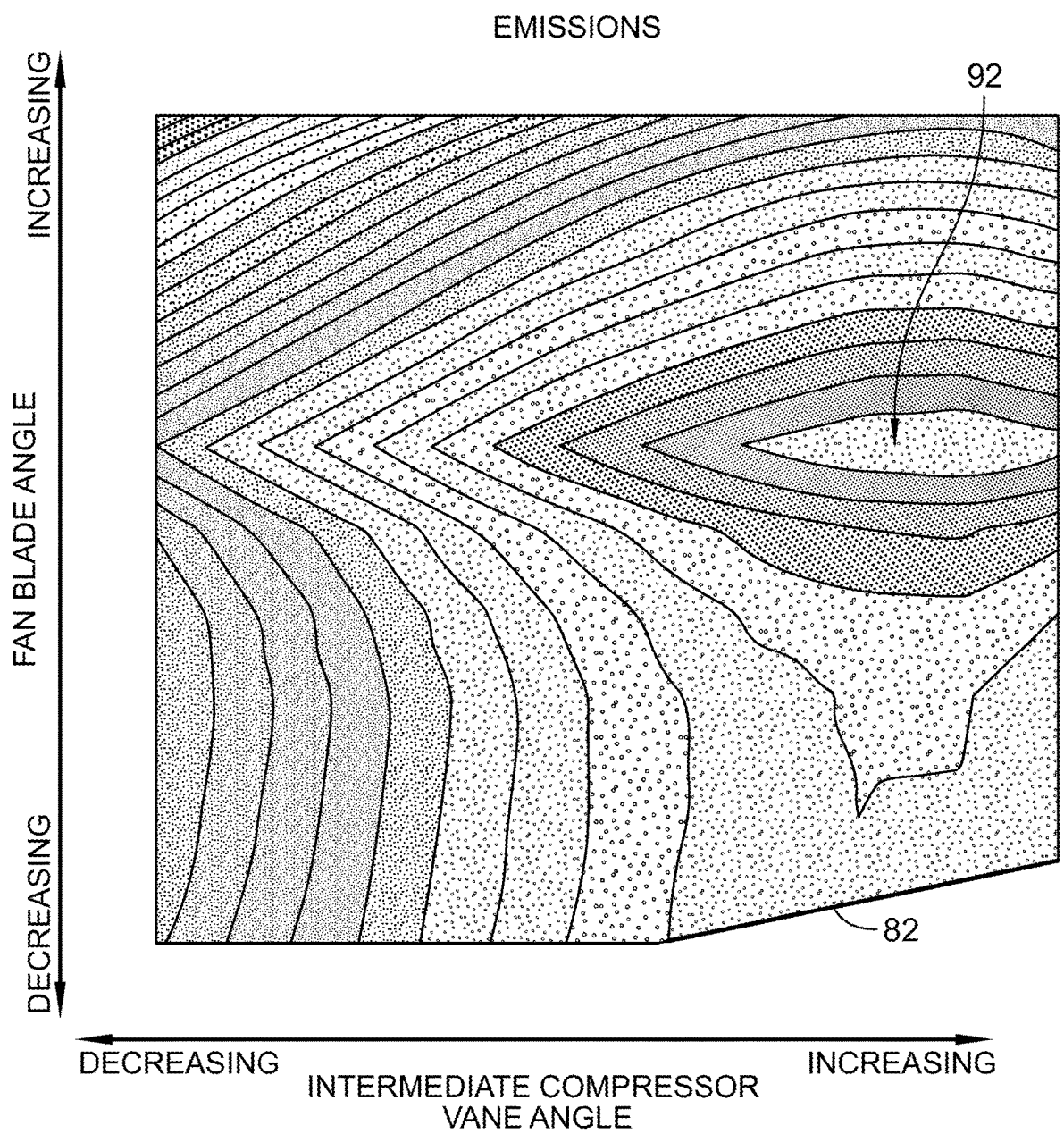
FIG. 11 is a graph showing emissions of the gas turbine engine of FIG. 1 for different combinations of fan blade and compressor vane angles for a given operating condition of the engine and further showing limits that bound the range of fan blade and compressor angles for that operating condition.

The graph of FIG. 11 illustrates emissions of the gas turbine engine 10 for the different ranges of fan blade angles and compressor vane angles. The ranges of angles for the fan blades and compressor vanes are bounded by the high pressure compressor corrected speed limit 82 along a bottom of the graph. An optimal fan blade pitch angle and compressor vane pitch angle for minimizing emissions at the given operating condition and limits of the engine 10 are indicated as range 92. As one example, the emissions may be NOx.

The graphs of FIGS. 5-11 are examples of the manner in which the optimization of the operating parameters of gas turbine engine 10 may be calculated under various conditions. This information may then be stored in look-up tables used by the control system 22 to choose the angles of the fan blades 28 and the compressor vanes 15 to control the operation of the gas turbine engine 10 during the flight cycle 54. In some embodiments, the calculations of the optimization of the angles may be conducted in real-time. In either case, the control system 22 adjusts the geometry of the fan 12 and compressor 14 to achieve the optimization. By combining the adjustability of the geometry of the fan 12 with the compressor 14, the performance of a particular gas turbine engine 10 is expanded to take advantage the adjustment of the fan 12 and the compressor 14 cooperatively to compensate for the variations induced by on or the other of the fan 12 or compressor 14.

In some embodiments, the engine performance characteristic is selected manually by the pilot. In some embodiments, the engine performance characteristic selected is determined by the controller based on the expected flight cycle. In some embodiments, the engine performance characteristic selected is based on real time engine performance, engine operating condition, and/or flight cycle which are calculated or received by the controller.

In some embodiments, two or more engine performance characteristics are selected to be optimized. As a result, optimal pitch angles of the fan blades and compressor vanes are selected around the optimal point 90 of the two or more engine performance characteristics such that the selected fan blade and compressor vane pitch angles are close to or as close as possible to the optimal point 90 of the two or more engine performance characteristics charts.

The engine in accordance with the present disclosure includes a variable pitch fan and variable compressor geometry and this disclosure provides a controller and method for scheduling of both sets of geometry. Variable geometry fans may be used to maintain a constant engine rotation speed, while the variable geometry in the compressor is used to maintain compressor stability. It is believed that, historically, engines have not been designed with variable geometry fans and variable geometry in the compressor. An engine of the present disclosure may operate at a constant fan speed and vary thrust in the fan by varying the fan-blade pitch and fuel flow. The variable pitch fan may be adjusted to control noise in certain environments.

According to the present disclosure, the schedules of the variable geometry of the fan blades and compressor are designed on the optimization of desired engine outputs for improved engine performance. For example, the engine parameters that may be optimized include specific fuel consumption, thrust, turbine inlet temperature, engine noise, engine operability, emissions, or any other suitable parameter.

For any given operating condition (i.e. altitude, flight Mach number, throttle setting, ambient temperature, etc.), the variable geometry can be set such that the specific fuel consumption is at its optimum setting, for example. This optimization would occur within any limits, such as mechanical and corrected speeds, stability limits, temperature limits, etc. Such limits could be steady state limits or transient limits. The schedule could be over-ruled by other requirements at a given operating condition in some embodiments. For example, the variable geometry could also be used to do any of the following: maximize available thrust during a One-Engine-Out situation; minimize turbine inlet temperature during key high-temperature conditions; and minimize engine noise during take-off and landing conditions.

To accomplish this scheduling of pitch angles, outputs of engine model optimization could be built into tables that would be referenced from the engine control or a real-time-model could be run with real-time simulation and optimization. The objective function could be set or changed by the pilot in real time during operation or set to specific functions ahead of time.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising,
a variable pitch fan mounted for rotation about a center axis,
the variable pitch fan including a plurality of variable-pitch fan blades that each extend radially outward relative to the center axis along a corresponding one of a plurality of fan-pitch axes,
each of the plurality of variable-pitch fan blades being configured to rotate selectively about the corresponding fan-pitch axis,
an engine core comprising
a compressor having an intermediate pressure stage of the compressor and a high pressure stage of the compressor rotatable independent of the intermediate stage of the compressor, a combustor, and a turbine,
the intermediate pressure stage of the compressor including a plurality of variable-pitch compressor vanes that each extend radially outward relative to the center axis along a corresponding one of a plurality of compressor-pitch axes,
each of the plurality of variable-pitch compressor vanes being configured to rotate selectively about the corresponding compressor-pitch axis,
a control system configured to rotate the plurality of variable-pitch fan blades to a specific fan-pitch angle and to rotate the plurality of variable-pitch compressor vanes to a specific vane-pitch angle to minimize noise produced by the gas turbine engine at a given operating condition of the gas turbine engine,
wherein the control system is further configured to select the specific fan-pitch angle from a predetermined range of fan-pitch angles that minimize noise produced by the gas turbine engine for the given operating condition and that are bounded by preset fan operating limits of the gas turbine engine at the given operating condition, wherein the control system is further configured to select the specific vane-pitch angle from a predetermined range of vane-pitch angles that minimize noise produced by the gas turbine engine for the given operating condition and that are bounded by preset compressor operating limits of the gas turbine engine at the given operating condition, and wherein the preset fan operating limits that hound the predetermined range of fan-pitch angles and the preset compressor operating limits that bound the predetermined range of vane-pitch angles, each include both a surge limit of the intermediate pressure stage of the compressor and a corrected rotational speed limit of the high pressure stage of the compressor.

2. The gas turbine engine of claim 1, wherein the given operating condition includes at least one of an altitude of the gas turbine engine, a flight Mach number of the gas turbine engine, a throttle setting, and an ambient temperature.

3. The gas turbine engine of claim 2, wherein the preset fan operating limits of the gas turbine engine at the given operating condition further include a surge limit of the fan.

4. The gas turbine engine of claim 1, wherein the control system is configured to rotate each of the plurality of variable-pitch fan blades about the corresponding one of the plurality of fan-pitch axes independent of each of the plurality of variable-pitch compressor vanes, and the control system is further configured to rotate each of the plurality of variable-pitch compressor vanes about the corresponding one of plurality of compressor-pitch axes independent of each of the plurality of variable-pitch fan blades.

5. The gas turbine engine of claim 4, wherein the turbine includes at least a high pressure stage of the turbine and a low pressure stage of the turbine that is rotatable independent of the high pressure stage of the turbine, and the low pressure stage of the turbine drives the intermediate pressure stage of the compressor and the variable pitch fan.

6. The gas turbine engine of claim 1, wherein the preset fan operating limits of the gas turbine engine and the preset compressor operating limits of the gas turbine engine at the given operating condition are included in at least one look-up table stored in the control system.

7. The gas turbine engine of claim 1, wherein the given operating condition of the gas turbine engine is one of taxi, takeoff, and landing.

8. A gas turbine engine comprising,
a variable pitch fan mounted for rotation about a center axis,
the variable pitch fan including a plurality of variable-pitch fan blades that each extend radially outward relative to the center axis along a corresponding one of a plurality of fan-pitch axes,
each of the plurality of variable-pitch fan blades being configured to rotate selectively about the corresponding fan-pitch axis,
an engine core comprising a compressor having an intermediate pressure stage of the compressor and a high pressure stage of the compressor that rotates independent of the intermediate pressure stage of the compressor, a combustor, and a turbine,
the intermediate stage of the compressor including a plurality of variable-pitch compressor vanes that each extend radially outward relative to the center axis along a corresponding one of a plurality of compressor-pitch axes,
each of the plurality of variable-pitch compressor vanes being configured to rotate selectively about the corresponding compressor-pitch axis, a control system configured to
rotate the plurality of variable-pitch fan blades to a specific fan-pitch angle and to rotate the plurality of variable-pitch compressor vanes to a specific vane-pitch angle to minimize specific fuel consumption of the gas turbine engine during operation of the gas turbine engine at a given operating condition of the gas turbine engine, wherein the control system is further configured to select the specific fan-pitch angle from a predetermined range of fan-pitch angles that minimize specific fuel consumption of the gas turbine engine for the given operating condition and that are bounded by preset fan operating limits of the gas turbine engine at the given operating condition, wherein the control system is further configured to, for each engine performance characteristic of the plurality of engine performance characteristics, select the specific vane-pitch angle from a predetermined range of vane-pitch angles that minimize specific fuel consumption of the gas turbine engine for the given operating condition and that are hounded by preset compressor operating limits of the gas turbine engine at the given operating condition, wherein the preset fan operating limits that bound the predetermined range of fan-pitch angles include all of a surge limit of the variable pitch fan, a surge limit of the intermediate pressure stage of the compressor, a fan corrected speed limit, and a corrected rotational speed limit of the high pressure stage of the compressor, and wherein the preset compressor operating limits that bound the predetermined rage of vane-pitch angles include the surge limit of the intermediate pressure stage of the compressor and a corrected rotational speed limit of the high pressure stage of the compressor.

9. A gas turbine engine comprising,
a variable pitch fan mounted for rotation about a center axis,
the variable pitch fan including a plurality of variable-pitch fan blades that each extend radially outward relative to the center axis along a corresponding one of a plurality of fan-pitch axes,
each of the plurality of variable-pitch fan blades being configured to rotate selectively about the corresponding fan-pitch axis,
an engine core comprising a compressor having an intermediate pressure stage of the compressor and a high pressure stage of the compressor that rotates independent of the intermediate pressure stage of the compressor, a combustor, and a turbine,
the intermediate stage of the compressor including a plurality of variable-pitch compressor vanes that each extend radially outward relative to the center axis along a corresponding one of a plurality of compressor-pitch axes,
each of the plurality of variable-pitch compressor vanes being configured to rotate selectively about the corresponding compressor-pitch axis,
a control system configured to
rotate the plurality of variable-pitch fan blades to a specific fan-pitch angle and to rotate the plurality of variable-pitch compressor vanes to a specific vane-pitch angle to minimize emissions of the gas turbine engine during operation of the gas turbine engine at a given operating condition of the gas turbine engine, wherein the control system is further configured to select the specific fan-pitch angle from a predetermined range of fan-pitch angles that minimize emissions of the gas turbine engine for the given operating condition and that are bounded by preset fan operating limits of the gas turbine engine at the given operating condition, wherein the control system is further configured to, for each engine performance characteristic of the plurality of engine performance characteristics, select the specific vane-pitch angle from a predetermined range of vane-pitch angles that minimize emissions of the gas turbine engine for the given operating condition and that are bounded by preset compressor operating limits of the gas turbine engine at the given operating condition, wherein the preset fan operating limits that bound the predetermined range of fan-pitch angles and the compressor preset operating limits that bound the predetermined range of vane-pitch angles each include a corrected rotational speed limit of the high pressure stage of the compressor.

* * * * *